US005602586A

United States Patent [19]

Schauer et al.

[11] Patent Number: 5,602,586
[45] Date of Patent: Feb. 11, 1997

[54] BUILT-IN TEST FOR DYNAMIC RASTER VIDEO OUTPUT

[75] Inventors: Steven A. Schauer, Bosque Farms; Larry J. Thomas, Albuquerque, both of N.M.

[73] Assignee: Honeywell Inc., Minneapolis, Minn.

[21] Appl. No.: 237,519

[22] Filed: May 3, 1994

[51] Int. Cl.⁶ .................................. H04N 17/02
[52] U.S. Cl. .................. 348/189; 348/180; 348/181
[58] Field of Search .................... 348/180, 181, 348/189, 190, 191, 192, 193; 345/104

[56] References Cited

U.S. PATENT DOCUMENTS

| 5,309,376 | 5/1994 | Barraco et al. | 348/180 X |
| 5,311,295 | 5/1994 | Tallman et al. | 348/180 |
| 5,345,262 | 9/1994 | Yee et al. | 348/177 |

FOREIGN PATENT DOCUMENTS 0198692  10/1986  European Pat. Off. .

Primary Examiner—Victor Kostak
Assistant Examiner—Nathan J. Flynn
Attorney, Agent, or Firm—Kenneth J. Johnson

[57] ABSTRACT

A built-in test for dynamic raster video output is described for testing a plurality of analog video signals created from digital raster data, each of the analog signals having a plurality of analog signal components. In the apparatus, an addressing device is provided for selecting one of the analog signals to be tested, and a selector selects a desired analog signal component from the selected analog signal. An A/D converter then converts the selected signal component into a digital signal component, and a characteristic value is extracted therefrom. A memory is provided which stores predetermined characteristic value range data, and the extracted characteristic value is compared with the stored range data by a comparator to produce a result. A combination device then creates a combination of the result and an address of the selected analog signal component, and the combination is then stored for later retrieval.

14 Claims, 4 Drawing Sheets

5,602,586

BUILT-IN TEST FOR DYNAMIC RASTER VIDEO OUTPUT

GOVERNMENT RIGHTS

The United States Government has rights in this invention pursuant to Contract No. F33600-88-G-5107, awarded by the Department of the Air Force.

BACKGROUND OF THE INVENTION

The invention relates generally to testing the output of video display generators and, in particular, to a dynamic video test for the single or multiple channel video output of a color or monochromatic-type video display generator.

Video display generators are used to output on one or more channels analog video signals created from digital raster data. These analog video signals create color or monochromatic ("mono") video images. A mono image is generally created from a mono signal on a single video channel, while a color image is generally created from several distinct color signals, each on a separate video channel. For example, a standard red, green and blue (RGB) color image is created from a red, a green and a blue analog video signal, each being output from a video display generator on a distinct output channel. The video display generator may also output an overlay image (which "overlays" the video image) on a separate video channel. Within each channel, a mono or color output video signal may have several distinct components, including an "active video" portion, a "video blank" portion and a "video sync" portion, all of which are well known in the art and are not described in detail herein.

To create an analog video signal from digital raster data, a video display generator must retrieve the digital data from memory to create a digital signal. The display generator then creates an analog signal from the digital signal with a digital-to-analog (D/A) converter. The analog signal is then amplified and displayed as a video image.

During the video image creation process, many factors adversely affect the analog video signal output from the display generator. For example, signal interpolation within the D/A converter introduces distortions to the analog signal. These distortions are then magnified during amplification of the signal. In addition, the analog amplifier, which functions differently at different signal frequencies, creates further distortion in the analog output. Because of the non-linearities introduced by the elements of the video display generator, the output analog signal is not a completely accurate representation of the digital data from which it was created. Although perfectly accurate video images cannot be expected, it is often necessary to ensure that the displayed image is as accurate a representation of the digital data as possible.

SUMMARY OF THE INVENTION

The invention provides a dynamic video test for analog video signals created by a video display generator from digital raster data. The invention retrieves analog video signals from one or more output video channels and digitally compares the signals to the data from which they were created. The test results are stored until retrieved.

In addition, the invention provides a test for dynamic video output of a video display generator which separately tests each of the video components of an analog video signal. The test results for each of the components are stored until retrieved.

According to one aspect of the invention, the invention comprises a test apparatus for dynamic testing of a plurality of analog video signals created from digital raster data, each of the analog video signals having a plurality of analog signal components, the apparatus comprising an addressing means for selecting one of the analog signals, a selection means for selecting a desired analog signal component from the selected analog signal, an A/D converter which converts the selected analog signal component into a digital signal component, an extracting means for extracting a characteristic value from the digital signal component, a memory which stores predetermined characteristic value range data, a comparator for comparing the characteristic value to the stored characteristic value range data to produce a result, a combination means for creating a combination of the result and an address of the analog signal component selected by the selection means, and storage means for storing the combination created by the combination means.

In another aspect of the invention, the invention comprises a test apparatus for dynamic testing of an analog video signal, comprising an A/D converter which converts the analog video signal into a converted video signal, an extracting means for extracting a characteristic value from the converted video signal, a memory which stores predetermined characteristic value range data, a comparator which compares the characteristic value to the stored characteristic value range data to produce a result, and storage means for storing the result.

In yet another aspect of the invention, the invention relates to a test apparatus for dynamic testing of a plurality of analog video signals, comprising an addressing means for selecting one of the analog video signals, an A/D converter which converts the analog signal selected by the addressing means into a converted video signal, an extracting means for extracting a characteristic value from the converted video signal, a memory which stores predetermined characteristic value range data, a comparator which compares the characteristic value to the stored characteristic value range data to produce a result, and storage means for storing the result.

According to another aspect, the invention relates to a method for dynamic testing of an analog video signal, comprising the steps of: converting the analog video signal into a converted video signal, extracting a characteristic value from the converted video signal, storing predetermined characteristic value range data, comparing the characteristic value to the stored characteristic value range data to produce a result, and storing the result.

In another aspect of the invention, the invention relates to a method for dynamic testing of a plurality of analog video signals, comprising the steps of: selecting one of the analog video signals, converting the selected analog video signal into a converted video signal, extracting a characteristic value from the converted video signal, storing predetermined characteristic value range data, comparing the characteristic value to the stored characteristic value range data to produce a result, and storing the result.

DESCRIPTION OF THE PREFERRED EMBODIMENTS

Preferred embodiments of the invention will be described in detail with reference to the accompanying FIGS.

Figure 1:
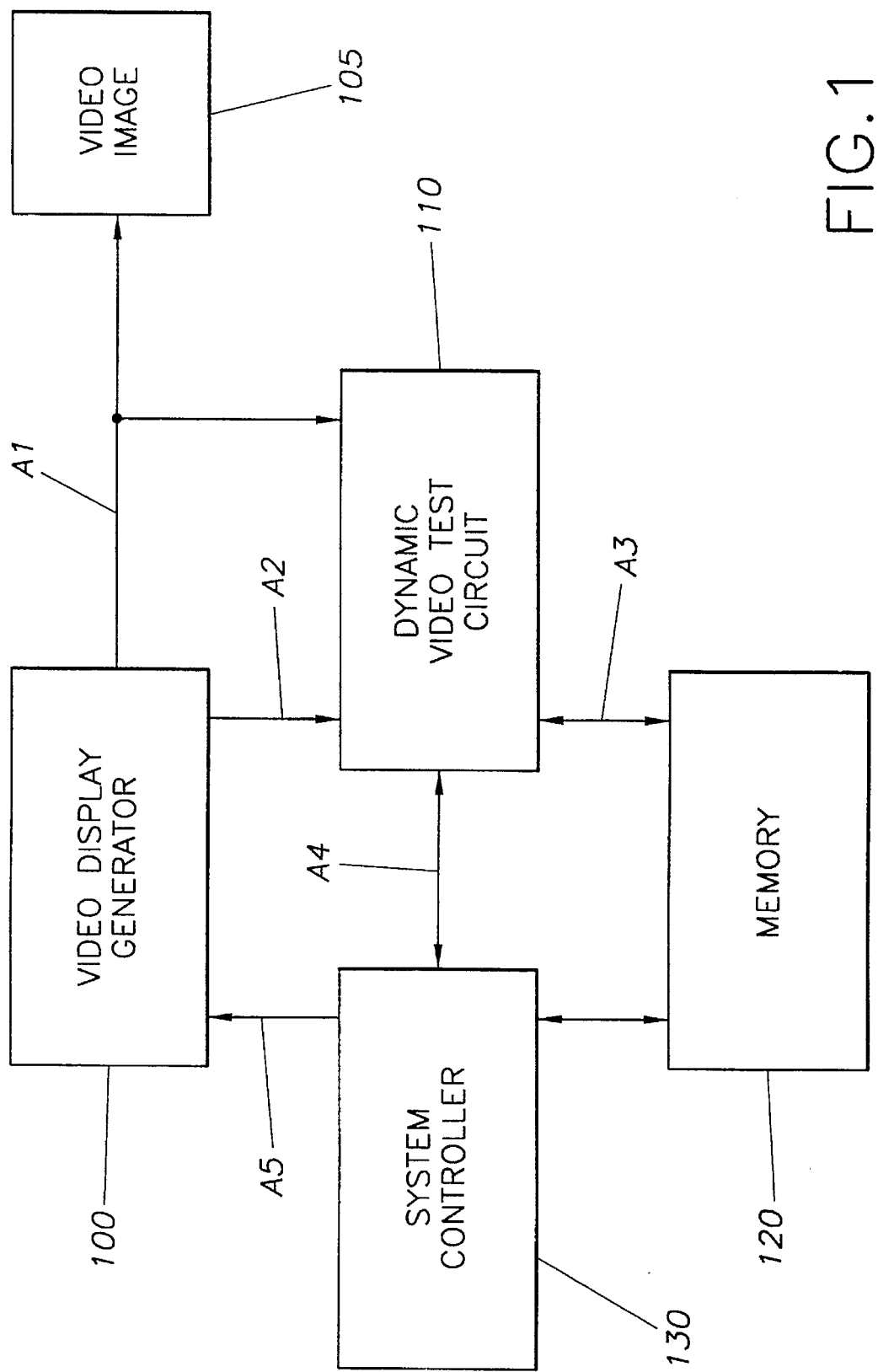
FIG. 1 is a functional block diagram of a preferred embodiment of the invention.

FIG. 1 shows a video system including a dynamic video test (DVT) circuit 110. A video display generator 100 outputs analog video signals A1 which are used to create a video image 105. The DVT circuit 110 receives the analog video signals A1, as well as the digital video signals A2 from which they were created. The digital signals A2 are then used by the DVT circuit 110 to retrieve predetermined values A3 from a memory 120. The DVT circuit 110 compares the analog video signals A1 to the values A3 from memory, thereby producing status results A4. The status results A4 are then retrieved from the DVT circuit 110 during a read video status operation of a system controller 130. The system controller 130 uses the status results A4 to create control signals A5 which adjust the output of the video display generator 100.

Figure 2:
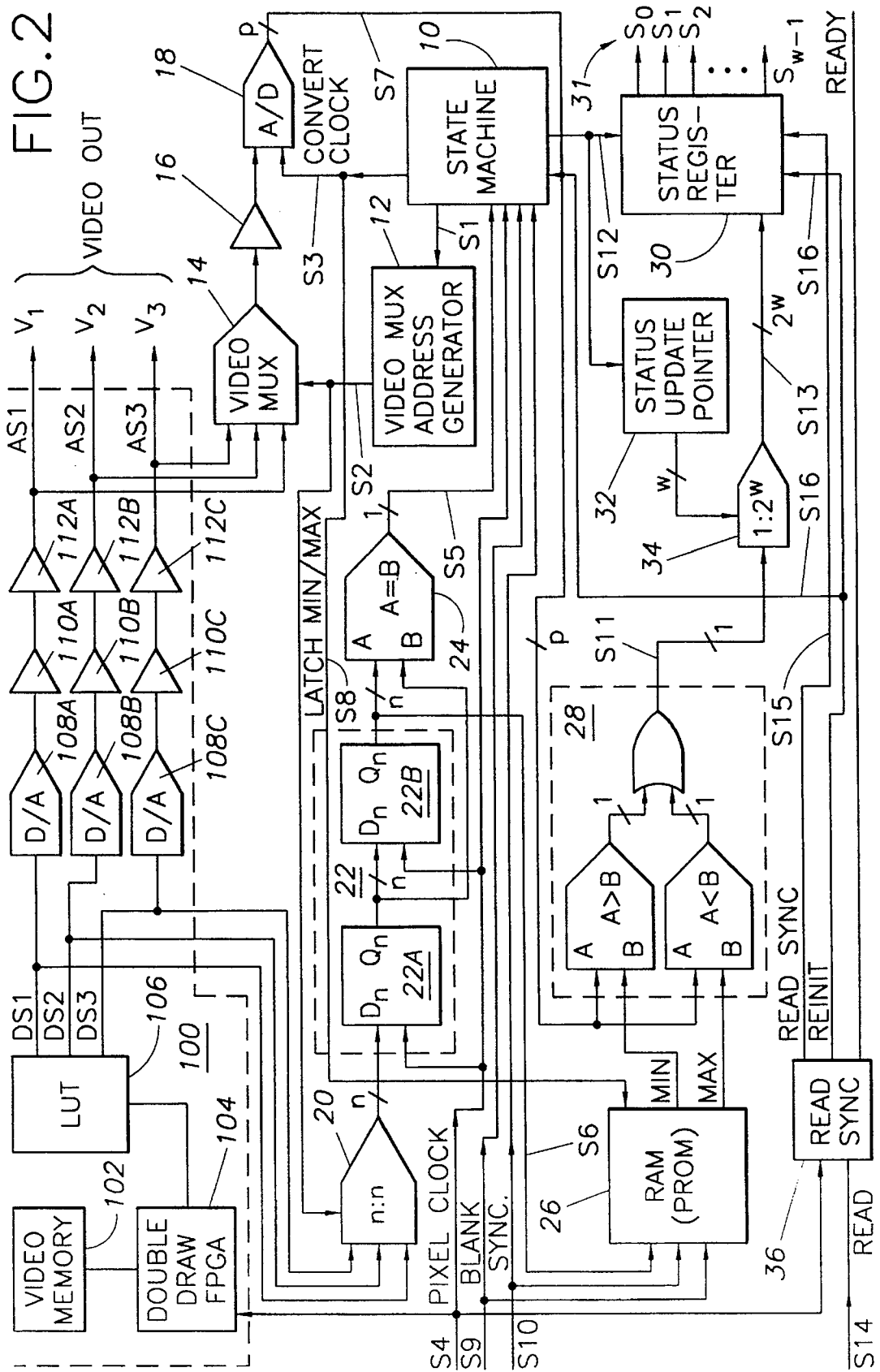
FIG. 2 is a schematic diagram of a preferred embodiment of the invention.

FIG. 2 is a schematic diagram of a preferred embodiment of the built-in dynamic video test (DVT) of the invention. In this embodiment, red, green and blue analog video signals AS1, AS2 and AS3 are output on video channels $V_1$, $V_2$ and $V_3$ by a video display generator 100. Within the video display generator 100, digital raster data is retrieved from a video memory 102. Any overlay data is enhanced, if necessary, by a "double draw" field programmable gate array (FPGA) 104, which will be described in more detail below. Red, green and blue color values are then determined from a look-up table (LUT) 106, which outputs red, blue and green digital video signals DS1, DS2 and DS3. Analog signals are created from these digital signals by digital-to-analog (D/A) converters 108A, 108B and 108C, amplified by analog amplifiers 110A, 110B and 110C, and output as analog video signals AS1, AS2 and AS3 by output current buffers 112A, 112B and 112C.

The double draw FPGA 104 is a device which enhances overlay data prior to the creation of the corresponding signal. An overlay image is an image which is laid over another image. For example, the video display generator in an airplane may overlay a flight path image onto an image of the terrain below. Because an overlay image may at times be only a single pixel in width, the overlay image may be very difficult to distinguish from the primary image. The double draw FPGA 104 solves this problem by examining digital overlay data for areas which are only a single pixel in width. When such an area is found, the double draw device widens the overlay image by placing the single pixel overlay data into several pixels immediately adjacent the overlay data pixel. In this manner, the double draw FPGA 104 enhances the clarity of an overlay image.

The built-in test is conducted, one channel at a time, by verifying that "active video", "video blank" and "video sync" components of the analog video signals conform to criteria predetermined from the corresponding digital video signals. The analog video channel to be tested is selected by a video multiplexer (mux) address generator 12. The video mux address generator 12 is a small counter incremented by a VIDEO MUX ADDRESS CLOCK signal S1, which is generated by a state machine 10 which controls the test process. A video mux 14 uses a VIDEO MUX ADDRESS signal S2 created by the address generator 12 to select the appropriate output channel $V_1$, $V_2$ or $V_3$, and to retrieve the corresponding analog video signal AS1, AS2 or AS3. The chosen analog video signal is passed through amplifier 16 to analog-to-digital (A/D) converter 18, where it is converted into a p-bit digital signal S7 when the A/D converter 18 receives a CONVERT CLOCK signal S3 from the state machine 10. At the same time that the analog video signal is retrieved by the video mux 14, the VIDEO MUX ADDRESS signal S2 notifies an LUT data bus mux 20 to retrieve a corresponding n-bit digital video signal DS1, DS2 or DS3 from the LUT 106 within the video display generator 100. The video channel address carried by the VIDEO MUX ADDRESS signal S2 remains unchanged until the test cycle for the corresponding video channel is completed, at which time the address is incremented to prepare the DVT circuit 110 to test the next video channel. The bit sizes of the above p-bit and n-bit signals may be determined by the user of the dynamic video test circuit.

A test on a selected video channel does not begin until a stable video signal is detected by a double pixel detection circuit 22. This circuit monitors the n-bit digital video signal selected by the LUT data bus mux 20 for data values which are equal for two successive cycles of a PIXEL CLOCK signal $4 generated by the system controller 130. When latches 22A and 22B in the double pixel detection circuit 22 output the same n-bit digital signal, a digital comparator 24 sends a DOUBLE PIXEL signal S5 to the state machine 10, forcing the state machine 10 out of its initial state (state 0). However, the double pixel detection circuit 22 is not limited to the detection of only two successive data values. Instead, the circuit may be configured to look for equal data values for any number of cycles of the PIXEL CLOCK signal S4 simply by increasing the number of latches in the series. For example, if a third latch were added after latch 22B, the test would begin when a "TRIPLE PIXEL" signal S5 occurred, signifying the appearance of three successive equal data values in the digital signal.

When a double pixel is found and the dynamic video test begins, the n-bit digital signal S6 output by the double pixel detection circuit 22 is used to retrieve a range of values (window values) to which the p-bit output signal S7 (the converted analog signal) of A/D converter 18 is compared. A predetermined table of window values is loaded into an external random access memory (RAM) 26 at power-up (or, in the alternative, is hard-coded into a programmable read-only memory (PROM)). Although the n-bit digital signal S6, a BLANK signal S9 (generated by the system controller 12), and a SYNC signal S10 (also from the system controller 130) continuously address the RAM 26, the appropriate window values are not retrieved from the table until the RAM 26 receives a LATCH MIN/MAX signal S8 from the state machine 10. When this signal occurs, the minimum and maximum window values are output to a comparator module 28. The comparator module 28 then determines whether the converted analog signal S7 from the A/D converter 18 falls between the minimum and maximum window values and outputs the result as a single status bit S11.

A w-bit, D-type status register 30, whose bit size may also be determined by the user, stores the test results for each video output channel. Each bit 31 of the status register 30 holds the status data for one of the components of the analog video signal for a particular video output channel. For example, in this embodiment, the video display generator 100 produces a color video image by supplying a red, a blue or a green analog video signal AS1, AS2 or AS3 on each of three separate channels $V_1$, $V_2$, or $V_3$, thus requiring three test cycles. If the red and blue video channels each contain an "active video" portion and a "video blank" portion, and if the green video channel contains an "active video" portion, a "video blank" portion and a "video sync" portion, the status register 30 must hold seven status bits 31, one for each component of each channel.

Within each of the three test cycles, each component of a single video channel $V_1$, $V_2$ or $V_3$ is tested when the state machine 10 reaches a given state, as described in more detail below. However, before a particular component of the video channel is tested, a STATUS UPDATE CLOCK signal S12 increments a status update pointer 32, a small counter which tracks the address of the status register bit 31 for the component under test. The status update pointer 32 supplies this address to a demultiplexer (demux) 34, which then creates a STATUS signal S13 by combining this address with the corresponding test result status bit S11 from the comparator module 28. During the next STATUS UPDATE CLOCK signal S12, the status register 30 receives the STATUS signal S13 and updates the status data for the corresponding status bit contained in status bits 31.

The status register 30 retains the status data, updating with each STATUS UPDATE CLOCK signal S12, until the system controller 130 sends a READ signal S14 during a read status operation. Once a READ signal S14 has occurred, the next PIXEL CLOCK signal S4 causes a read sync module 36 to issue a READ SYNC signal S15 to the status register 30, thereby allowing the system controller 130 to retrieve the stored status data from the status register 30. At the same time, the read sync module 36 delivers a REINIT signal S16 which clears the status register 30 and returns the state machine 10 to its initial state. As before, the state machine 10 remains in the initial state until it receives a DOUBLE PIXEL signal S5 and is clocked by PIXEL CLOCK signal S4.

Figure 3A:
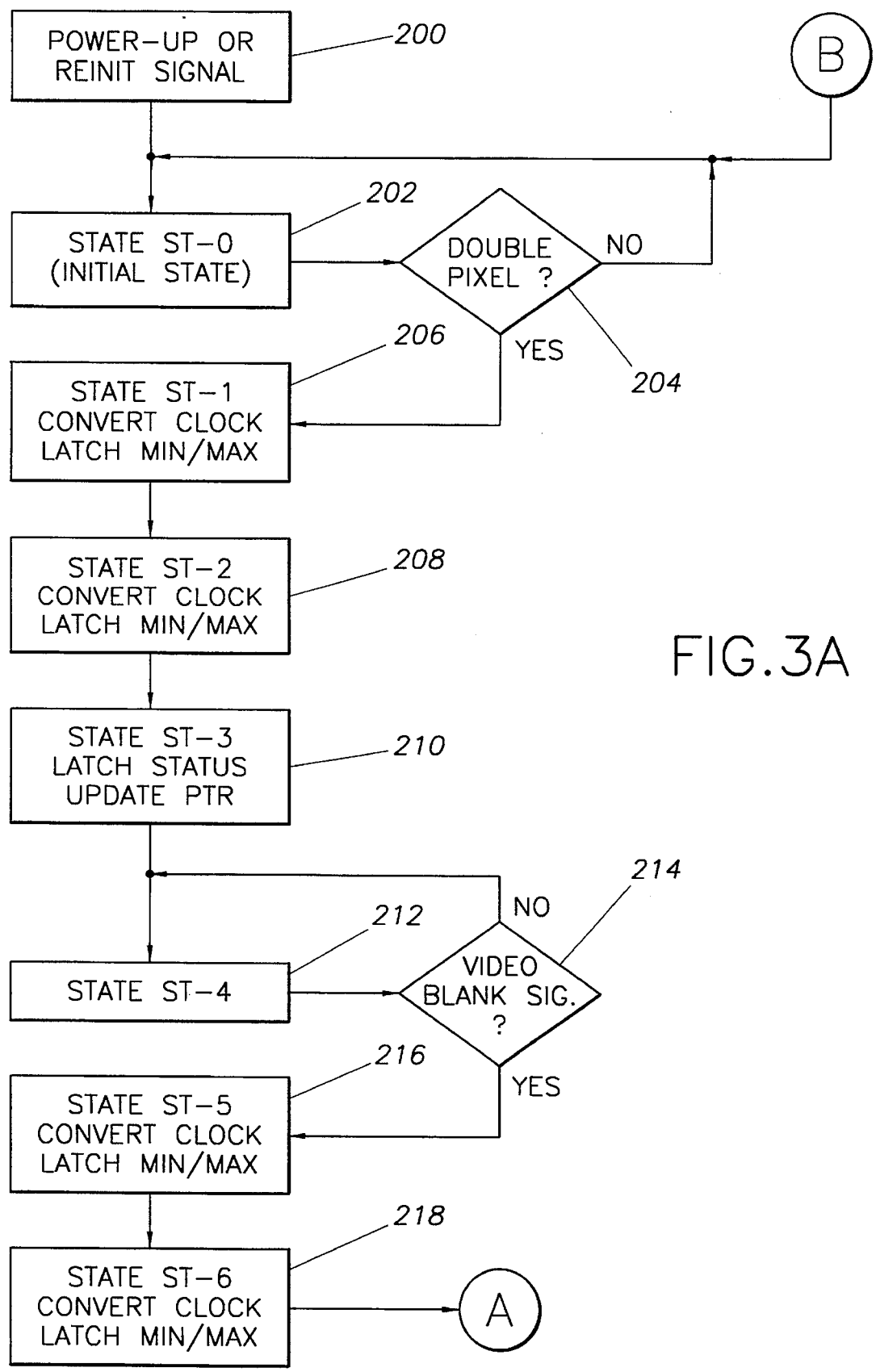
FIGS. 3A and 3B are a flow diagram showing state transition in a test cycle of the embodiment of FIG. 2.
Figure 3B:
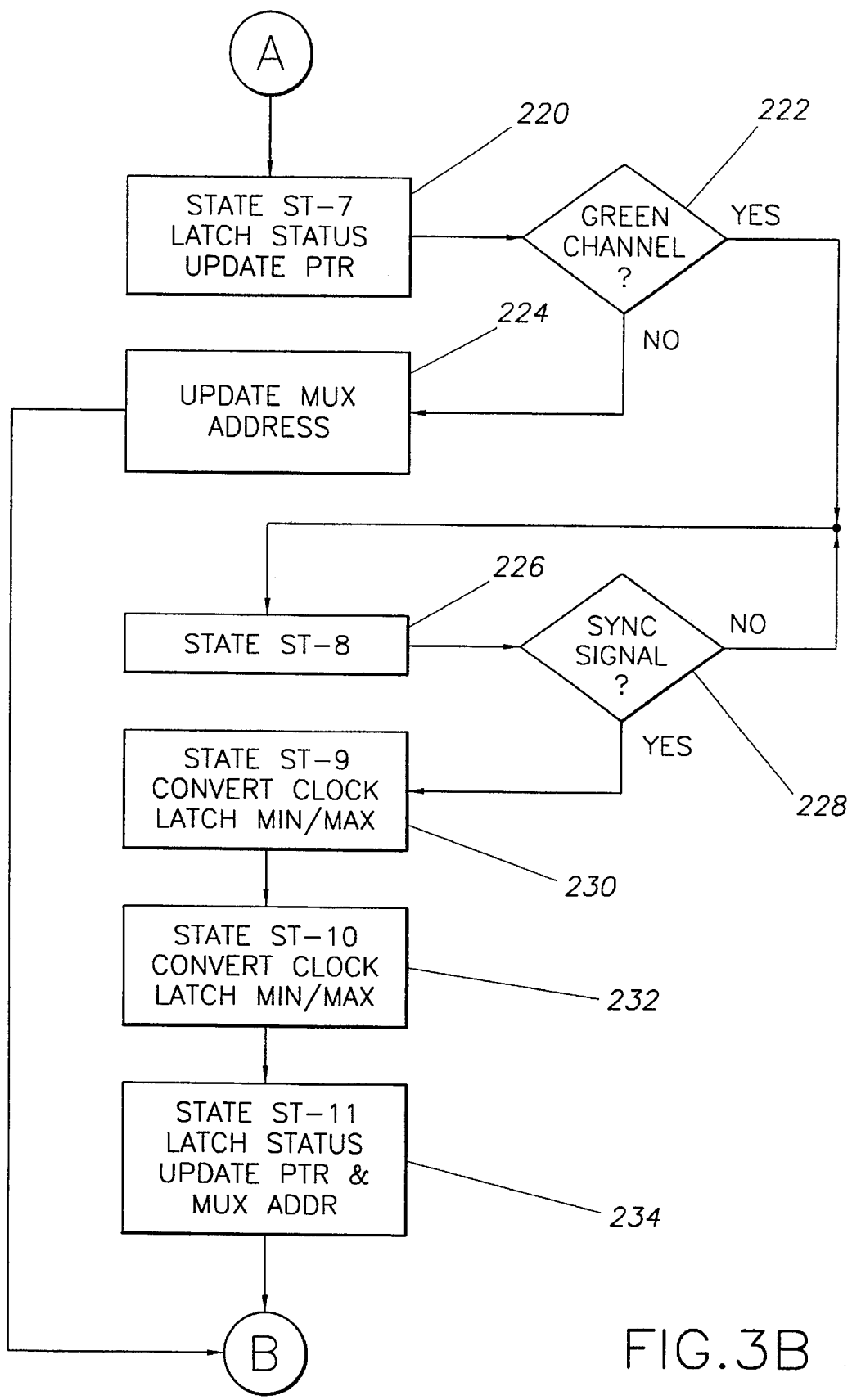

FIGS. 3A and 3B are a flow diagram showing state transition during a test cycle of the preferred embodiment of the invention as shown in FIG. 2. At step 200 in FIG. 3A, system power-up, or a REINIT signal S16, initializes the address in the video mux 14 to that of the red video channel, initializes the address in the LUT data bus mux 20 to that of the red digital data, initializes the status update pointer 32 to the red "active video" portion, and forces the state machine 10 into state ST-0 (the initial state, 202). The state machine 10 remains in state ST-0 as it awaits a DOUBLE PIXEL signal S5 (204).

When a DOUBLE PIXEL signal S5 is received, the state machine 10 enters state ST-1 (206). At state ST-1, a CONVERT CLOCK signal S3 is sent to the A/D converter 18, which performs an A/D conversion of the analog video signal retrieved by the video mux 14. In addition, the LATCH MIN/MAX signal S8 causes retrieval of the corresponding minimum and maximum window values from the RAM 26. The state machine 10 then enters state ST-2 (208).

At state ST-2 another CONVERT CLOCK signal S3 causes the A/D converter 18 to output the converted analog signal S7 obtained at state ST-1 to the comparator module 28. Another LATCH MIN/MAX signal S8 again latches the minimum and maximum window values, and the comparator module 28 compares the converted analog signal S7 to the window values.

When the state machine 10 enters state ST-3 (210), the STATUS UPDATE signal S12 causes the status register 30 to latch the red "active video" STATUS signal S13. The STATUS UPDATE signal S12 also updates the status pointer 32 to the red "video blank" component. The state machine then enters state ST-4 (212) and awaits a "video blank" signal (214).

When the state machine 10 enters state ST-5 (216), the red "video blank" signal is A/D converted, and the appropriate minimum and maximum window values are latched, as described at state ST-1. When state ST-6 is entered (218), the A/D converter 18 outputs the converted analog signal S7, and the minimum and maximum window values are again latched, as described at state ST-2. When the state machine 10 enters state ST-7 (220), the red "video blank" STATUS signal S13 is latched by the status register 30, and the status pointer 32 is updated to the blue "active video" portion of the blue video channel. Since the current VIDEO MUX ADDRESS is not that of the green channel, no "video sync" signal exists on the channel and a "no" answer will be obtained in step 222. The test cycle then ends and the mux address is updated (224) for retrieval of the analog video signal on the blue video channel. The state machine 10 then enters state ST-0 (202) and awaits the next test cycle.

When a blue double pixel occurs (204), state ST-1 is entered (206) and the blue "active video" and "video blank" signals are converted and tested in states ST1-ST7, as described above for the red video channel. Since the VIDEO MUX ADDRESS is not that of the green channel, the answer in step 222 is again "no", and the test cycle ends. The mux address is then updated to the green channel (224), and the state machine reenters state ST-0 (202).

When a green double pixel occurs (204), the green "active video" and "video blank" signals are converted and tested at states ST1-ST7, as described above for the red video channel. However, since the VIDEO MUX ADDRESS is now that of the green channel, the answer in step 222 is "yes" and the state machine 10 enters state ST-8 (226) and awaits a green "video sync" signal (228). When the "video sync" signal is received, the state machine 10 enters state ST-9 (230). At state ST-9, the green "video sync" signal is A/D converted, and the appropriate minimum and maximum window values are retrieved. When the state machine 10 enters state ST-10 (232), the A/D converter 18 outputs the converted analog signal S7 to the comparator module 28, and again the minimum and maximum window values are latched. When state ST-11 is entered (234), the status register 30 latches the green "video sync" STATUS signal S13, the status pointer is updated to point again to the red "active video" portion, and the VIDEO MUX ADDRESS is returned to that of the red video channel. The initial state is then reentered (202), and the test sequence is ready to begin again on the red video channel.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications of the dynamic video test, both as to the equipment details and operating procedures, can be accomplished without departing from the scope of the invention itself.

The embodiments of the invention in which an exclusive property or right is claimed are defined as follows:

1. A test apparatus for dynamic testing of an analog video signal having a plurality of analog signal components, comprising:

selection means for selecting one of said analog signal components from said analog video signal;

an A/D converter which converts the selected analog signal component into a converted video signal;

extracting means for extracting a characteristic value from said converted video signal;

a memory which stores predetermined characteristic value range data;

a comparator which compares said characteristic value to said stored characteristic value range data to produce a result; and storage means for storing said result.

2. A test apparatus for dynamic testing of a plurality of analog video signals created from digital raster data, each of said analog video signals having a plurality of analog signal components, said apparatus comprising:

addressing means for selecting one of said analog signals to be tested;

selection means for selecting a desired analog signal component from the selected analog signal;

an A/D converter which converts the selected analog signal component into a digital signal component;

extracting means for extracting a characteristic value from said digital signal component;

a memory which stores predetermined characteristic value range data;

a comparator for comparing said characteristic value to said stored characteristic value range data to produce a result;

combination means for creating a combination of said result and an address of the analog signal component selected by said selection means; and storage means for storing the combination created by said combination means.

3. The test apparatus of claim 1, wherein all of said analog signal components are selected by said selection means during a test cycle.

4. A test apparatus for dynamic testing of a plurality of analog video signals, comprising:

addressing means for selecting one of said analog video signals;

an A/D converter which converts the analog signal selected by said addressing means into a converted video signal;

extracting means for extracting a characteristic value from said converted video signal;

a memory which stores predetermined characteristic value range data;

a comparator which compares said characteristic value to said stored characteristic value range data to produce a result; and storage means for storing said result.

5. The apparatus of claim 4, wherein each of said plurality of analog signals comprises a plurality of analog signal components.

6. The apparatus of claim 5, further comprising selection means for selecting one of said analog signal components of the analog video signal selected by said addressing means, wherein the selected analog signal component is converted into the converted video signal by the A/D converter.

7. The apparatus of claim 6, further comprising cycling means for ensuring that each of said analog signal components of each of said analog signals is selected by said selection means.

8. The apparatus of claim 2, further comprising cycling means for ensuring that each of said analog signal components of each of said analog signals is selected by said selection means.

9. A method for dynamic testing of an analog video signal having a plurality of analog signal components, comprising the steps of:

selecting one of said analog signal components from said analog video signal;

converting said selected analog signal component into a converted video signal;

extracting a characteristic value from said converted video signal;

storing predetermined characteristic value range data;

comparing said characteristic value to said stored characteristic value range data to produce a result; and storing said result.

10. The method of claim 9, wherein all of said analog signal components are selected during a test cycle.

11. A method for dynamic testing of a plurality of analog video signals, comprising the steps of:

selecting one of said analog video signals;

converting the selected analog video signal into a converted video signal;

extracting a characteristic value from said converted video signal;

storing predetermined characteristic value range data;

comparing said characteristic value to said stored characteristic value range data to produce a result; and storing said result.

12. The method of claim 11, wherein each of said plurality of analog video signals comprises a plurality of analog signal components.

13. The method of claim 12, further comprising the step of selecting one of said analog signal components from the selected analog video signal, wherein the selected analog signal component is converted into the converted video signal.

14. The method of claim 13, further comprising the step of ensuring that each of said analog signal components of each of said analog video signals is selected.

* * * * *